(12) United States Patent
Belharouak et al.

(10) Patent No.: US 12,444,780 B2
(45) Date of Patent: Oct. 14, 2025

(54) RECOVERY OF MATERIALS FROM SPENT BATTERIES USING A GREEN SOLVENT

(71) Applicant: UT-Battelle, LLC, Oak Ridge, TN (US)

(72) Inventors: Ilias Belharouak, Oak Ridge, TN (US); Yaocai Bai, Oak Ridge, TN (US); Rachid Essehli, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 945 days.

(21) Appl. No.: 17/551,395

(22) Filed: Dec. 15, 2021

(65) Prior Publication Data

US 2022/0200073 A1  Jun. 23, 2022

Related U.S. Application Data

(60) Provisional application No. 63/126,695, filed on Dec. 17, 2020.

(51) Int. Cl.
| | | |
|---|---|---|
| *H01M 10/54* | (2006.01) | |
| *H01M 4/62* | (2006.01) | |
| *H01M 10/0525* | (2010.01) | |

(52) U.S. Cl.
CPC .......... *H01M 10/54* (2013.01); *H01M 4/622* (2013.01); *H01M 10/0525* (2013.01)

(58) Field of Classification Search
CPC ........ H01M 10/54; H01M 4/48; H01M 4/623; H01M 4/661; H01M 10/052; H01M 6/52; Y02W 30/84
See application file for complete search history.

(56) References Cited

U.S. PATENT DOCUMENTS

| | | | | |
|---|---|---|---|---|
| 6,150,050 | A * | 11/2000 | Mathew | H01M 10/54 429/49 |
| 6,447,669 | B1 * | 9/2002 | Lain | H01M 6/52 429/49 |
| 9,484,606 | B1 * | 11/2016 | Sloop | H01M 10/54 |
| 2018/0013181 | A1 * | 1/2018 | Ho | H01M 6/52 |
| 2021/0083336 | A1 * | 3/2021 | Baek | H01M 4/505 |

FOREIGN PATENT DOCUMENTS

CN    108281730 A * 7/2018 ............ H01M 10/54

OTHER PUBLICATIONS

Sawada et al., Effect of citrate-based non-toxic solvents on poly(vinylidene fluoride) membrane preparation via thermally induced phase separation, Nov. 1, 2015, Journal of Membrane Science, vol. 493, pp. 232-242 (Year: 2015).*

* cited by examiner

*Primary Examiner* — Maria Laios
*Assistant Examiner* — Benjamin T Lustgraaf
(74) *Attorney, Agent, or Firm* — WARNER NORCROSS + JUDD LLP

(57) ABSTRACT

A method for recycling lithium-ion battery materials is provided. The method includes isolating a composite electrode that includes an electrode material adhered to a current collector. The isolated composite electrode is combined with a citrate-based solvent to form a mixture. The electrode material is delaminated from the current collector in the mixture to give a free electrode material and a free current collector. Each of the free electrode material and the free current collector is recovered from the mixture. The free electrode material may be reused to prepare another composite electrode, as well as a lithium-ion battery comprising the same, which are also disclosed.

16 Claims, No Drawings

RECOVERY OF MATERIALS FROM SPENT BATTERIES USING A GREEN SOLVENT

CROSS-REFERENCE TO RELATED APPLICATIONS

This application claims the benefit of U.S. Provisional Application 63/126,695, filed Dec. 17, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present disclosure relates generally to battery recycling and, more specifically, to a method of directly recycling spent lithium-ion batteries by recovering reusable components therefrom.

BACKGROUND OF THE INVENTION

Since their commercialization in the early 1990s, lithium-ion batteries have been widely used to power consumer electronics. Meanwhile, they are gaining increasing popularity in electric vehicles (e.g. electric vehicles (EVs), hybrid vehicles (HVs), plug-in hybrid vehicles (PHVs), etc.) owing to their high-energy density and long cycle life. However, in addition to growing adoption and development of lithium-ion battery-powered technologies, there is an increasing concern of flooding the market with end-of-life batteries. Specifically, estimates projecting that over 11 million metric tons of lithium-ion batteries will approach end-of-life in the decade between 2020-2030. Unfortunately, the vast majority of such end-of-life lithium-ion batteries have historically ended up in landfills, increasing potential risks of contamination to local soil and groundwater and removing useful materials from many electronic supply chains. Despite these mounting concerns, there is still a severe lack of incentive to recycle spent lithium-ion batteries, with estimates indicating that fewer than 5% of all lithium-ion batteries are being recycled at present.

In terms of the economy of recycling, most of the recoverable value in spent lithium-ion batteries is in the cathode, as that component constitutes the major value added in production. As such, state-of-the-art recycling approaches involving pyrometallurgical and hydrometallurgical processes have been increasingly developed and optimized for the recovery of metals from spent cathodes. However, pyrometallurgy is energy-intensive and cannot reclaim lithium, and hydrometallurgy involves caustic reagents (e.g. hydrochloric and nitric acids) and requires complicated purification and separation steps.

Direct recycling has recently been proposed in attempts to recover cathode materials with still-useful morphology and preserved chemical structures. Specifically, direct recycling processes aim to maintain the morphology of the recovered electrode materials to save efforts involved with subsequent regeneration processes, while also minimizing impurities (e.g. from current collectors and side reaction products) to circumvent both complex separation processes and contamination of the re-usable active materials being recovered. It will be appreciated that such an approach has the possibility to lower the overall number of recycling steps preceding new cell manufacturing, thereby reducing energy consumption (and hence, battery cost) while also alleviating environmental impacts by reducing greenhouse gas and SOx emissions.

Unfortunately, efficiently separating electrode materials from adjacent current collectors represents a major challenge for direct recycling and the metallurgical processes above. Specifically, an adhesive binder is typically employed between electrode films and current collectors in order to achieve longer cycle life and higher energy densities and increase long-term stability of the batteries. One such binder employed for these purposes is polyvinylidene difluoride (PVDF), which is a highly non-reactive thermoplastic fluoropolymer prepared by polymerization of vinylidene difluoride (i.e., 1,2-difluoroethylene). PVDF is one of the most common binders used for cathodes of lithium ion batteries due to its superior electrochemical and thermal stability and excellent adhesion between current collectors and electrode films. Unfortunately, these same properties (i.e., strong adhesion coupled with high resistance to solvents, acids, and hydrocarbons) increase the difficulty and complexity of recycling batteries using such composite electrodes by necessitating inefficient and energy intensive pre-treatment steps to separate the electrode components. However, this pretreatment is important for improving the recycling efficiency, as well as for reducing the energy consumption associated with the subsequent separation processes.

With regard to direct recycling in particular, workable separation processes are even more limited due to the necessary preservation of active materials being recovered. As such, several approaches have recently attempted, but ultimately failed, to meet the requirements for direct cathode recycling. For example, high-temperature thermal treatments effectively decompose PVDF, but affect both the crystal structure and the morphology of the active materials, while also releasing hydrogen fluoride (HF). Another separation approach involves dissolving PVDF with an organic solvent. However, owing to the nature of PVDF described above, commonly available solvents that are capable of dissolving PVDF under workable conditions, such as N-methyl-2-pyrrolidone (NMP) and N,N-dimethylformamide (DMF), are volatile and toxic and thus limited with regard to scale-up. Other reaction media, such as $AlCl_3$-NaCl molten salt and deep eutectic choline chloride/glycerol solvents have also been investigated, but failed to effectuate a useful separation of cathode materials from aluminum foils without altering both the morphology and composition of the recovered cathode materials.

As such, while direct recycling processes remain promising in terms of potential recycling process capable of wide-spread adoption (e.g. to mitigate and manage the growing number of end-of-life packs and cells, and recover valuable materials there from), there remains significant challenges to the initial separation of composite electrodes in order to recover re-usable components therefrom in a cost-effective and environmentally friendly manner.

SUMMARY OF THE INVENTION

A method of recycling lithium-ion batteries is provided. The method is useful for recovering re-usable components, in particular components of composite electrodes, from spent lithium-ion batteries. The method includes isolating from a spent lithium-ion battery a composite electrode comprising an electrode material adhered to a current collector. The method further includes combining the isolated composite electrode with a citrate-based solvent to form a mixture. The method further includes delaminating the electrode material from the current collector in the mixture to give a free electrode material and a free current collector. The method also includes recovering each of the free electrode material and the free current collector from the mixture.

The method provides a highly efficient, cost-effective, and environmentally sustainable separation process that enables direct recycling of lithium-ion batteries. In some embodiments, the citrate-based solvent may include one or more of acetyl tributyl citrate (ATBC), acetyl triethyl citrate (ATEC), triethyl citrate (TEC), and tributyl citrate (TRC). In some embodiments, the electrode material may be delaminated from the current collector in the citrate-based solvent at a temperature in the range of 20 to 300° C. under continuous stirring. In some embodiments, the electrode material and the current collector may be fully delaminated within a time of 60 minutes after forming the mixture. In some embodiments, the method may further include the step of shredding the composite electrode into a collection of smaller composite electrode fragments before the step of combining the composite electrode with the citrate-based solvent. In some embodiments, a binder that adheres the electrode material to the current collector may be dissolved in the citrate-based solvent, and the binder may be one of a polyvinylidene fluoride (PVDF) binder and a carboxymethyl cellulose (CMC) binder.

In certain embodiments, the composite electrode may be one or both of a spent electrode from a spent lithium-ion battery and electrode scrap from an electrode manufacturing process. In certain embodiments, the composite electrode may be further defined as a composite cathode, and the electrode material may be further defined as a cathode active material. In the composite cathode, the cathode active material may comprise a lithium-bearing metal oxide and/or the current collector may comprise aluminum. In certain embodiments, the composite electrode may be further defined as a composite anode, and the electrode material may be further defined as an anode active material. In the composite anode, the anode active material may comprise an electroconductive carbon compound and/or the current collector may comprise copper.

In certain embodiments, the step of isolating the composite electrode may include separating the composite electrode from one or more other components of the lithium-ion battery, and/or washing the composite electrode with a solvent to remove a residual electrolyte therefrom. In certain embodiments, the step of recovering each of the free electrode material and the free current collector from the mixture may include filtering the mixture to extract at least one of the free electrode material and the free current collector, and/or rinsing the at least one of the free electrode material and the free current collector with a solvent to remove a residual amount of the citrate-based solvent therefrom.

The free electrode material recovered from the mixture may have substantially the same morphology as the electrode material, substantially the same chemical composition as the electrode material, and/or substantially the same electrochemical performance as the electrode material. The recovered free electrode material may also be directly reusable in the preparation of a new composite electrode. The free current collector recovered from the mixture may be substantially free from corrosion and/or residual electrode material.

In some embodiments, the method may further include preparing a new composite electrode using the free electrode material. Additionally, the method may include preparing a new lithium-ion battery using the new composite electrode.

These and other features of the invention will be more fully understood and appreciated by reference to the description of the embodiments, when viewed in accordance with the accompanying examples and the appended claims.

DETAILED DESCRIPTION OF THE CURRENT EMBODIMENTS

A method of recycling lithium-ion batteries is provided. As described herein, the method provides a direct recycling process, and thus may be used to recover certain components of lithium-ion batteries with intact chemical structures. The recovered components may then be reused, e.g. by preparing new components and/or new batteries therewith, thus driving down the overall production cost of preparing new batteries. As described below, the method enables an economic and more environmentally-friendly recovery of materials from spent lithium-ion batteries compared to conventional recycling methods, by using non-toxic and non-odorous citrate-based solvents. The citrate-based solvents effectively separate the black mass from metal foils without any deterioration on either part and with nearly 100% dissolution of both the binders used in the coating of cathode and anode materials.

In general, the method comprises separating electrode material from current collectors in isolated composite electrodes. As understood by those of skill in the art, a primary challenge for enabling direct recycling is separating electrode materials or black mass from the current collectors in a manner that is efficient, economical, and results in minimal or no changes to the chemical structure (e.g. morphology, composition, etc.) of both the electrode material (e.g. black mass) and the current collectors. The high stability and strong bonding capability of the organic binders utilized in typical lithium-ion batteries make it difficult to separate the electrode materials from the current collectors. As such, conventional processes for separating these components exhibit high energy consumption, low peeling-off efficiency, and produce numerous byproducts that increase environmental pollution loads. Comparatively, as described in the exemplary embodiments and demonstrated in the example herein, the current method possesses a high peeling-off efficiency, uses cost-effective materials and techniques, and is both energy efficient and environmentally friendly.

More particularly, the method includes isolating a composite electrode comprising an electrode material adhered to a current collector; combining the isolated composite electrode with a citrate-based solvent to form a mixture; delaminating the electrode material from the current collector in the mixture to give a free electrode material and a free current collector; and recovering each of the free electrode material and the free current collector from the mixture. The details of these steps of the method are described in detail below.

As will be appreciated in view of the description and examples herein, the scope of lithium-ion batteries suitable for use in the method is not especially limited, and particular such batteries will be selected by one of skill in the art in view of the particular embodiments exemplified herein, limited only by the requirements of certain components and/or composition features (e.g. such as the inclusion of a composite electrode suitable for use in the method processes described below). In general, lithium-ion batteries comprise common components, which typically include a shell or case (or "shell casing"), electrodes for storing lithium ions (e.g. a cathode electrode and an anode electrode) disposed within the shell, a separator disposed between the electrodes, and an organic electrolyte suitable for carrying the lithium ions between the electrodes through the separator. The lithium-ion batteries may be manufactured as or otherwise utilized in any particular form or type of battery, such as a coin cell (e.g. CR2032), a pouch cell, a cylindrical cell, or a combination thereof. For example, a plurality of lithium-ion batteries may be arranged in the form of a battery pack.

Regarding the battery components, the shell may include or be formed from any material known in the art for lithium-ion batteries. Typically, the shell includes a plastic material, a metal-containing material, or a combination thereof. In some embodiments, exemplary shells typically consist essentially of a single material component and are substantially homogeneous in composition. Examples of such materials include stainless steels, nickel-plated steels, and plastic-metal composites (e.g. aluminum-plastic compositions, laminates, etc.).

The separator of suitable lithium-ion batteries is not particularly limited, as will be understood in view of the description below. As such, any separator suitable for use in a lithium-ion battery can theoretically be utilized, with particular separators being selectable for use in view of the other battery components by one of skill in the art (e.g. to provide a low resistance against ion migration of the electrolyte, excellent electrolyte solution-wetting ability, etc.). General examples of such materials are selected from glass fiber, polyester, Teflon, polyolefins (e.g. polyethylene (PE), polypropylene (PP), polytetrafluoroethylene (PTFE), etc.), and various combinations thereof, and may be utilized in a form of a nonwoven or woven fabric. Specific examples of separators typically include porous membranes comprising PE, PP, or PE/PP copolymers, which are generally unreactive with organic solvents and thus suitable for safe use with the other battery components.

The electrolyte is also not particularly limited in terms of the method, and thus suitable lithium-ion batteries may generally include any electrolyte solution or composition suitable for use in a lithium-ion battery. General examples of such electrolyte compositions generally include various liquid electrolytes and solid electrolytes. Example of liquid electrolytes typically include electrolyte salts (e.g. lithium salts, such as $LiPF_6$, $LiBF_4$, $LiCF_3SO_3$, $Li(SO_2CF_3)_2$, $LiClO_4$, $(C_4BO_8Li)$, $(C_2BO_4F_2Li)$, $LiPF_4C_2O_4$, $Li(CF_3SO_2)_2N$, $(Li(C_2F_5SO_2)_2N)$, $LiCF_3SO_3$, $LiAlF_4$, $LiBF_4$, $Li(FSO_2)_2N$, $Li_2SO_4$, $LiAlO_2$ LiSCN, LiBr, LiI, $LiAsF_6$, $LiB(Ph)_4$, $LiSO_3CH_3$, $Li_2S_x$) in an organic solvent (e.g. alkyl carbonates, such as ethylene carbonate, dimethyl carbonate, diethyl carbonate, etc. but not limited to, EC-DMC, EC-DEC, EC-PC, EC-PC-DMC, EC-PC-DEC, or EC-DEC-DMC).

The electrodes of lithium-ion batteries suitable for the method typically include an electrode material adhered to a current collector with an organic binder. The particular electrode material and current collector will be selected based on the use of the particular electrode. i.e., as a cathode electrode ("cathode") or an anode electrode ("anode") in the battery utilized.

In some embodiments, the composite electrode is further defined as a composite cathode. In such embodiments, the electrode material is further defined as a cathode active material. It will be appreciated that, as a component of the lithium-ion battery being recycled, the cathode active material typically comprises a lithium-bearing metal oxide. Examples of such compounds include $LiCoO_2$, $LiMn_2O_4$, $LiNiO_2$, $LiCrO_2$, $LiFePO_4$, $LiNiO_2$, $LiMn_2O_4$, $LiV_2O_5$, $LiTiS_2$, $LiMoS_2$, $LiMnO_2$, $LiFe_{1-z}M_yPO_4$, as well as variations of lithium nickel oxides, lithium nickel manganese oxides, lithium nickel manganese cobalt oxides, and the like, exemplified by those having general formulas such as $LiNi_xMn_yO_2$, $Li_{1+z}Ni_xMn_yCo_{1-x-y}O_2$, $LiNi_xCo_yAl_zO_2$, $LiNi_xCo_yMn_zO_2$, etc., where each x, y, and z is typically a mole fraction of from 0 to 1, where x+y+z=1. Such materials are known in the art, and will be readily selected by those of skill in the art. The cathode active material may also comprise a conductive agent, e.g. for enhancing the electron conductivity of the cathode active material.

In some embodiments, the composite electrode is further defined as a composite anode. In such embodiments, the electrode material is further defined as an anode active material. Typically, the anode active material includes an electroconductive carbon compound. Examples of such compounds, which are also known as carbonaceous conductive materials, typically include graphene, graphite, and other various forms of carbon, such as paracrystalline carbon (e.g. carbon black). However, any suitable anode active material may be utilized, and will typically be selected on a basis of low cost, high coulombic efficiency, and high capacity. The anode active material may also include a conductive agent, e.g. for enhancing the electron conductivity of the anode active material. In some embodiments, the anode active material includes graphite and/or carbon black.

In general, the composite electrode includes a binder, such as an organic binder, to adhere together the active components thereof (e.g. the conductive materials, conductive agents, etc.), as well as to adhere the electrode material to the adjacent current collector. In the present embodiments, the organic binder is typically a polyvinylidene fluoride (PVDF)-based binder ("PVDF binder"), as will be best understood in view of the entire description and the examples herein. Examples of such PVDF binders generally include, either as a homopolymeric composition, as a copolymer or interpolymer of PVDF and one or more other monomers, or a multi-polymer composition comprising a PVDF homo- or copolymer with one or more other polymers. Such PVDF binders are known in the art, and will be readily selected by those of skill in the art in consideration of preparing the electrode materials and composite electrodes described herein. Examples of particular PVDF binders may include various combinations of polyvinylidene fluorides, polytetrafluoroethylenes, fluorinated ethylene-propylene copolymers (e.g. from tetrafluoroethylene and/or hexafluoropropylene, etc.), and various per- or polyfluoroalkoxy polymers. One of skill in the art will appreciate that, while PVDF is exemplified herein, other similar binders to those above, even some that are substantially free from, alternatively are free from PVDF, may also work as intended when utilized in the method. For example, a carboxymethyl cellulose (CMC) binder may be used to bind anode materials to an anode current collector.

The current collectors of suitable lithium-ion batteries are not particularly limited, as will be understood in view of the description below. In general, any current collector suitable for use in a lithium-ion battery can theoretically be utilized, with a particular current collector being selectable for use in view of the other battery components (i.e., the other electrode components, such as the binder and active materials thereof) by one of skill in the art. Examples of suitable current collectors generally include materials including aluminum, copper, nickel, titanium, stainless steel, and even some carbonaceous materials. The current collector may be in any form known in the art, such as plates, sheets, foils, etc. Such terms may be overlapping in scope, as the current collector may have any thickness that is suitable for carrying a current, but will typically be selected with a minimal thickness in order to maximize energy density. Other materials and structures, as well as specific treatments (e.g. etching, coating, etc.) may be utilized to enhance the electrochemical stability and electrical conductivity of current collectors; however, it will be appreciated that not all composite current collectors may be suitable for use in the method in all circumstances, as the conditions and materials may be optimized for homogeneous metallic current collectors.

The current collector for cathode and anode electrodes will be independently selected. In certain embodiments, the lithium-ion battery includes a cathode having an aluminum current collector. In specific embodiments, the cathode current collector is an aluminum sheet or foil. In these or other embodiments, the lithium-ion battery includes an anode having a copper current conductor. In specific embodiments, the anode current collector is a copper sheet or foil.

As introduced above, the method includes isolating the composite electrode from a spent lithium-ion battery. Typically, the method includes discharging the lithium-ion battery before further processing, i.e., to remove any remaining charge stored therein. In this fashion, the term "spent" is used herein to refer to a discharged battery, and is not necessarily limited to an end-of-life or fully discharged battery.

Techniques for discharging are not limited, and are exemplified by soaking the battery in an aqueous solution (e.g. neutral or alkaline) containing a conducting salt (e.g. $NaHCO_3$, $KHCO_3$, $Na_2CO_3$, $K_2CO_3$, $CaCO_3$, $MgCO_3$, $NaOH$, $KOH$, $Ca(OH)_2$, $Mg(OH)_2$, $NaCl$, $CaCl_2$, and the like, or combinations thereof). In some embodiments, the shell of the battery may be punctured (e.g. via piercing, cutting, etc.) before soaking in the aqueous solution for discharge.

Once the battery is discharged, isolating the composite electrode generally includes dismantling the battery and separating the composite electrode from the other battery components, such as the shell, electrolyte, separator, etc. The isolation process is not limited, and may be carried out in various fashions with any technique meeting the limitations of the embodiments described herein. For example, isolation techniques will typically be selected in view of the aim of the direct recycling, that is to not damage, destroy, or otherwise render the composite electrode less usable than in the native state prior to isolation.

In certain embodiments, the spent lithium-ion battery is chopped, cut, or shredded into smaller pieces (e.g. via manually or computer-monitored saw/blade cutting, waterjet cutting, etc.). The pieces may be sized for homogeneity, increased surface area, processing capabilities of the particular equipment utilized, etc.

In some embodiments, the method further includes washing the composite electrode. In such embodiments, the composite electrode is typically washed with an organic solvent that is unreactive with the composite electrode and also capable of removing any residual amount of electrolyte or particular matter from the composite electrode prior to combining the composite electrode with the citrate-based solvent as described below.

As introduced above, the method includes combining the isolated composite electrode with a citrate-based solvent to form a mixture. The citrate-based solvent may include, but is not limited to, one of or a combination of acetyl tributyl citrate (ATBC), acetyl triethyl citrate (ATEC), triethyl citrate (TEC), and tributyl citrate (TRC). Any amount of the citrate-based solvent may be utilized, the amount being selected based on the size of the separation being carried out, the amount of one component to be utilized, etc.

The citrate-based solvent in the mixture dissolves the binder present in the composite electrode and thereby provides for the delamination of the electrode material from the current collector in the mixture to give a free electrode material and a free current collector. The delaminating may be carried out by any means suitable for separating the electrode material and the current collector from one another. In general, once the mixture has been formed, delaminating the composite electrode simply requires mechanically separating the electrode material and the current collector from one another. As such, specific techniques such as peeling, or more general processes such as agitation (e.g. via stirring, shaking, tumbling, sonication, vortexing, etc.) may be utilized. In some embodiments, delaminating the electrode material from the current collector includes mechanically agitating the mixture, e.g. with a stirrer, stir bar, etc. In certain embodiments, the mixture is heated to a temperature of approximately 120° C. under continuous stirring during the delamination step. In such embodiments, the temperature of the citrate-based solvent may impact the effectiveness and/or rate at which the binder present in the electrode material is released from the current collector. The citrate-based solvent is capable of fully delaminating the electrode material from the current collector within a time of 60 minutes after forming the mixture.

Once delaminated, the components of the method are typically isolated or otherwise separated from each other. In particular, the free electrode material and the free current collector are recovered from the heterogeneous mixture including the citrate-based solvent. In some embodiments, the method includes filtering the mixture to extract at least one of the free electrode material and the free current collector. In some embodiments, the method also includes rinsing the free electrode material and/or the free current collector with a different solvent to remove a residual amount of the citrate-based solvent therefrom.

As introduced above, the method may be utilized in direct recycling, such that the components recovered from the battery may be reused. For example, in some embodiments, the free electrode material recovered from the mixture comprises substantially the same morphology as the initial electrode material. In these or other embodiments, the free electrode material recovered from the mixture has substantially the same chemical composition as the initial electrode material. In these or other embodiments, the free electrode material recovered from the mixture has substantially the same electrochemical performance as the initial electrode material. In some embodiments, the free electrode material recovered from the mixture is directly reusable in the preparation of a new composite electrode. However, it will be appreciated that the free electrode material may also be processed in numerous ways prior to such use or any final application.

In some embodiments, the free current collector recovered from the mixture is substantially free from corrosion. In these or other embodiments, the free current collector recovered from the mixture is substantially free from residual electrode material.

In some embodiments, the method further includes preparing a new composite electrode using the free electrode material. In some such embodiments, the method further includes preparing a new lithium-ion battery using the new composite electrode. In this fashion, the composite electrode may be reused, and thus that component of the battery recycled, once recovered. Similarly, in certain embodiments, the free current collector is reused to prepare a new composite electrode and/or a new battery.

EXAMPLE

The present method is further described in connection with the following laboratory example, which is intended to be non-limiting.

Cathode rejects/scraps from the trimmings of a $LiNi_{0.6}Mn_{0.2}Co_{0.2}O_2$ (NMC622) cathode that was fabricated using a pilot-scale slot-die coater (Frontier Industrial Technology) were used. The cathode consisted of NMC622 (Targray), carbon black (CB, Denka), and polyvinylidene fluoride (PVDF) binder (Solvay Solef 5130) in a weight ratio of 90:5:5. The areal loading of the NMC622 cathode was ~10.2 mg/cm$^2$. The citrate-based solvents (Citroflex) included acetyl tributyl citrate (ATBC), acetyl triethyl citrate (ATEC), triethyl citrate (TEC), and tributyl Citrate (TRC) which were purchased from Sigma-Aldrich and used without any treatment.

Cathode scraps of 5 g were cut into 1 cm$^2$ pieces manually and immersed in 50 mL of the citrate-based solvents. The solution was refluxed with continuous stirring at 120° C. for 1 hour in a round-bottom flask with a refluxing condenser. Al foils were separated from the mixture of cathode powders and citrate-based solvents via filtration, then washed extensively with ethanol and dried at 100° C. for 1 hour. Similarly, anode scraps of graphite were also treated in citrate-based solvents to separate the anode material from the Cu foil.

The crystal structure, surface morphology, and composition of the recovered materials were characterized by x-ray diffraction (XRD; PANalytical X'pert PRO) and scanning electron microscopy (SEM; Zeiss MERLIN). Fourier-transform infrared (FTIR) spectroscopy (Bruker) was used to analyze the existence of PVDF in the recovered cathode material.

The removal of PVDF binder in the recovered cathode powder in triethyl citrate (TEC), was confirmed by FTIR spectra. The characteristic peaks of pristine PVDF at 1400, 1180, and 870 cm$^{-1}$ which are attributed to the bending vibration of $CH_2$, symmetrical stretching of $CF_2$, and out-of-plane bending vibration of $CH_2$, respectively, were clearly distinguished in the cathode scraps. Those IR bands disappeared for the recovered cathode powder, suggesting through FTIR spectroscopy that no detectable PVDF binder was present in the recovered cathode powder.

Comparison of the powder x-ray diffraction patterns for NMC622 cathode rejects and the reclaimed cathode powder before and after calcination in air revealed that the separation process was benign and did not deteriorate the crystal structure. All the diffraction peaks can be indexed with the layered rhombohedral structure of $\alpha$-$NaFeO_2$. Furthermore, the XRD patterns were nearly identical and no impurity phases were observed.

The morphology of NMC622 recovered cathode particles were characterized by SEM. After treatment in the citrate-based solvents, the reclaimed microparticles displayed identical morphologies and sizes as the cathode scraps, emphasizing that the present solvent-based process did not destroy the active materials, which is especially important for the direct recycling approach.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of recycling lithium-ion battery materials, the method comprising:
   isolating a composite electrode, the composite electrode comprising an electrode material adhered to a current collector;
   combining the composite electrode with a citrate-based solvent to form a mixture, wherein the citrate-based solvent includes one or more of acetyl tributyl citrate (ATBC), acetyl triethyl citrate (ATEC), triethyl citrate (TEC), and tributyl citrate (TRC);
   delaminating the electrode material from the current collector in the mixture to give a free electrode material and a free current collector; and
   recovering each of the free electrode material and the free current collector from the mixture.

2. The method of claim 1, wherein the electrode material is delaminated from the current collector in the citrate-based solvent at a temperature in the range of 20 to 300° C. under continuous stirring.

3. The method of claim 1, wherein the electrode material and the current collector are fully delaminated within a time of 60 minutes after forming the mixture.

4. The method of claim 1, further comprising the step of shredding the composite electrode into a collection of smaller composite electrode fragments before the step of combining the composite electrode with the citrate-based solvent.

5. The method of claim 1, wherein the composite electrode is one or both of a spent electrode from a spent lithium-ion battery and electrode scrap from an electrode manufacturing process.

6. The method of claim 1, wherein the composite electrode is further defined as a composite cathode, and the electrode material is further defined as a cathode active material.

7. The method of claim 6, wherein in the composite cathode: (i) the cathode active material comprises a lithium-bearing metal oxide; (ii) the current collector comprises aluminum; or (iii) both (i) and (ii).

8. The method of claim 1, wherein the composite electrode is further defined as a composite anode, wherein the electrode material is further defined as an anode active material.

9. The method of claim 8, wherein in the composite anode: (i) the anode active material comprises an electroconductive carbon compound; (ii) the current collector comprises copper; or (iii) both (i) and (ii).

10. The method of claim 1, wherein isolating the composite electrode comprises:
    (i) separating the composite electrode from one or more other components of the lithium-ion battery; (ii) washing the composite electrode with a solvent to remove a residual electrolyte therefrom; or (iii) both (i) and (ii).

11. The method of claim 1, wherein recovering each of the free electrode material and the free current collector from the mixture comprises: (i) filtering the mixture to extract at least one of the free electrode material and the free current collector; (ii) rinsing the at least one of the free electrode material and the free current collector with a solvent to remove a residual amount of the citrate-based solvent therefrom; or (iii) both (i) and (ii).

12. The method of claim 1, wherein the free electrode material recovered from the mixture: (i) comprises substantially the same morphology as the electrode material; (ii) comprises substantially the same chemical composition as the electrode material; (iii) comprises substantially the same electrochemical performance as the electrode material; (iv) is directly reusable in the preparation of a new composite electrode; or (v) any combination of (i)-(iv).

13. The method of claim 1, wherein the free current collector recovered from the mixture is substantially free from: (i) corrosion; (ii) residual electrode material; or (iii) both (i) and (ii).

14. A method of recycling lithium-ion battery materials, the method comprising:
    isolating a composite electrode, the composite electrode comprising an electrode material adhered to a current collector;
    combining the composite electrode with a citrate-based solvent to form a mixture, wherein a binder that adheres the electrode material to the current collector is dissolved in the citrate-based solvent, the binder being one of a polyvinylidene fluoride (PVDF) binder and a carboxymethyl cellulose (CMC) binder;
    delaminating the electrode material from the current collector in the mixture to give a free electrode material and a free current collector; and
    recovering each of the free electrode material and the free current collector from the mixture.

15. The method of claim 1, further comprising preparing a new composite electrode using the free electrode material.

16. The method of claim 15, further comprising preparing a new lithium-ion battery using the new composite electrode.

* * * * *